3,352,656
METHOD OF MAKING GLASS-CERAMICS BY
DEVITRIFICATION IN A SINGLE STAGE
Peter William McMillan and Graham Partridge, Stafford, England, assignors to The English Electric Company Limited, London, England, a British company
No Drawing. Filed May 16, 1966, Ser. No. 550,182
4 Claims. (Cl. 65—33)

This invention relates to devitrified glass-ceramics, and is a continuation-in-part of United States application Ser. No. 269,333, filed Apr. 1, 1963, now abandoned.

Hitherto, in the process of controlled devitrification it has been considered necessary first to heat the glass to a nucleation temperature, at which temperature the glass was maintained for a time dependent on its composition, and then to heat the glass further to a higher temperature at which devitrification took place.

We have discovered that with many compositions of glass it is unnecessary to heat the glass in two stages in this manner.

According to the present invention, therefore, a method of making a glass-ceramic article includes forming the article in a glass which is capable of controlled devitrification and contains a nucleating agent, and heat-treating the article by raising its temperature progressively in a single stage to a temperature at which devitrification takes place, so as to devitrify the glass to a predominantly crystalline glass-ceramic material.

In the prior art, as mentioned above, it has been customary to produce devitrified glass-ceramics by subjecting the glass first to a nucleation stage, and secondly to a devitrification stage of heat-treatment. For example, U.S. Patent No. 2,920,971 (S. D. Stookey) discloses a method in which the glass is first subjected to a temperature, of which the optimum value is 50° C. above the annealing point (Mg point) of the glass, for an optimum time of 0.5 to 2.0 hours. To subject the glass to this temperature immediately after melting, it must of course be cooled from the melting temperature. Where the glass is pressed or drawn in the conventional manner, Stookey heats samples of a glass (identified as Composition 12) in a muffle furnace the temperature of which is increased from room temperature to 870° C., at which the samples are held for half an hour. Samples of another composition (identified as Composition 15) were nucleated by heating them from room temperature to 820° C., at which they were held for two hours.

A further heating step is then employed to cause heterogeneous crystallization of the glass, samples of the first composition (Composition 12) being heated to 1,345° C., which was held for one hour, and samples of the second composition (Composition 15) being raised to 1,250° C., which was held for one hour.

In prior specification No. 2,960,801 (C. B. King et al.) a nucleation heat-treatment of about 800° C. (775°–825° C.) for about one hour is disclosed, followed by a second, or crystallization, stage 1,150°–1,200° C. for about four hours.

In prior specification No. 2,960,802 (R. O. Voss), a nucleation heat-treatment of about 800° C. for one hour is disclosed, followed by a second stage of 1,080°–1,120° C. for about four hours.

In prior specification No. 2,971,853 (S. D. Stookey), the teaching is first to heat the glass between the annealing and softening points of the glass, that is between 500° and 540° C. for the glasses concerned, and secondly to heat the product above the softening point, between 800° and 950° C., to cause further crystallization.

Prior specification No. 3,063,198 (Babcock) deals with the devitrification of a solder glass, rather than of a solid glass product, but nevertheless discloses a sequence of heat-treatments including a nucleating stage at a lower temperature (e.g. 450° C. for one hour) followed by a devitrification stage at a higher temperature (e.g. 525° C. for one hour).

Glasses which may be formed into glass-ceramic articles by controlled devitrification according to the method of the present invention, have their major constituents within the following range, in percentages by weight:

| | |
|---|---|
| $SiO_2$ | 60–66 |
| $Al_2O_3$ | 18–20 |
| $Li_2O$ | 5.0–6.0 |
| $MgO$ | 0–3.0 |

The above major constituents together with the desired proportion of nucleating agent should total at least 90 percent of the glass. The remaining 10 percent of the glass may be made up of various non-essential constituents some of which take part in the glassy matrix of the ceramic together with residual $SiO_2$, $Al_2O_3$, $Li_2O$ and $MgO$. All percentages specified in this specification are percentages by weight. The nature of the non-essential constituents and the amounts by weight which are permissible are as follows in percentages of the glass:

| | |
|---|---|
| (i) $K_2O$ | 0–5 |
| (ii) $ZnO$ | 0–8.8 |

The nucleating agent may for example be tungsten oxide, or molybdenum oxide, or both, in an amount such as to be equivalent in the finished product to between 0.5 and 4.0 percent by weight of the glass of molybdenum trioxide or of tungsten trioxide or of both combined; or alternatively the nucleating agent may be a metallic phosphate in an amount such as to give in the finished product a quantity of the phosphate anion corresponding to 0.5 to 3.5 percent by weight of phosphorus pentoxide together with tungsten oxide, molybdenum oxide, vanadium oxide, and/or titanium oxide in an amount such as to be equivalent in the finished product to between 0.5 and 4.0 percent by weight of the respective metal trioxides either alone or combined in the case of tungsten and molybdenum, to between 0.5 and 2.0 percent by weight of vanadium pentoxide in the case of vanadium and to between 0.2 and 1.5 percent by weight of titanium dioxide in the case of titanium.

The following batch materials may be used for the major constituents:

| | |
|---|---|
| Ground quartz | $SiO_2$ |
| Aluminium oxide | $Al_2O_3$ |
| Aluminium hydroxide | $Al(OH)_3$ |
| Lithium carbonate | $Li_2CO_3$ |
| Magnesium oxide | $MgO$ | and for the minor constituents:

| | |
|---|---|
| Sodium carbonate | $Na_2CO_3$ |
| Sodium nitrate | $NaNO_3$ |
| Potassium carbonate | $K_2CO_3$ |
| Potassium nitrate | $KNO_3$ |
| Zinc oxide | $ZnO$ |
| Calcium carbonate | $CaCO_3$ |
| Boric acid | $H_3BO_3$ |

The batch materials are thoroughly mixed before melting. As a further constituent of the batch a suitable quantity of the nucleating agent is added which may conveniently be in the form of molybdenum trioxide and/or tungsten trioxide, in an amount such as to be equivalent in the finished product to between 0.5 and 4.0 percent by weight of molybdenum trioxide or of tungsten trioxide or of both combined.

Alternatively a metallic phosphate may be used as the nucleating agent in combination with the oxide of tungsten, molybdenum, vanadium and/or titanium in the amounts defined earlier in the specification.

The batch mixture is melted in crucibles at a temperature in the range 1,200° C. to 1,500° C. depending on the composition. The glass is then shaped to produce the desired article by normal glass-working processes, such as casting or pressing.

If it is required to store the articles before devitrification they are annealed at a suitable temperature depending on the glass composition. For the process of controlled devitrification, the temperature of the articles is raised (either from cold, if the articles have been stored, or from the temperature reached by the articles after working) at a rate not exceeding 10° C. per minute and preferably at between 3° C. and 5° C. per minute progressively, in a single stage, to the final crystallization temperature, which varies from approximately 700° C. to 1,250° C. depending on the composition. This temperature is maintained for a period of not less than 15 minutes and preferably for two hours, again depending on the composition and during this stage the crystallization occurs and a dense ceramic product containing closely interlocking crystals is obtained. The articles are then allowed to cool at a rate not exceeding 10° C. per minute, the normal cooling rate of the furnace usually being satisfactory.

Specific examples of devitrified glass-ceramic compositions which have been heat-treated in accordance with the method of the present invention are given in Tables 1–A and 1–B.

TABLE 1-A

| | Composition No. | | | | | | |
|---|---|---|---|---|---|---|---|
| | 1 | 2 | 3 | 4 | 5 | 6 | 7 |
| $SiO_2$ | 61.2 | 61.3 | 64.1 | 61.0 | 61.7 | 62.5 | 65.1 |
| $Al_2O_3$ | 18.3 | 18.6 | 19.0 | 18.2 | 18.5 | 18.5 | 19.3 |
| $Li_2O$ | 5.4 | 5.5 | 5.7 | 5.6 | 5.7 | 5.7 | 5.8 |
| $MgO$ | | | | | | | 2.7 |
| $K_2O$ | 4.2 | 2.9 | 4.5 | 4.1 | 4.2 | 4.2 | 4.5 |
| $ZnO$ | 5.2 | 8.6 | | 5.2 | 5.3 | 5.3 | |
| $MoO_3$ | 3.3 | | | | 2.2 | | 1.2 |
| $WO_3$ | | 1.8 | 4.0 | 3.5 | | | |
| $V_2O_5$ | | | | | | 1.4 | |
| $TiO_2$ | | | | | | | |
| $P_2O_5$ | 2.4 | 1.3 | | 2.4 | 2.4 | 2.4 | 1.4 |

TABLE 1-B

| | Composition No. | | | | | | |
|---|---|---|---|---|---|---|---|
| | 8 | 9 | 10 | 11 | 12 | 13 | 14 |
| $SiO_2$ | 64.1 | 63.6 | 65.3 | 64.5 | 61.2 | 61.6 | 60.6 |
| $Al_2O_3$ | 19.3 | 19.1 | 19.5 | 19.3 | 18.7 | 18.8 | 18.1 |
| $Li_2O$ | 5.8 | 5.8 | 5.9 | 5.8 | 5.5 | 5.5 | 5.1 |
| $MgO$ | 2.7 | 2.7 | 2.7 | 2.7 | | | |
| $K_2O$ | 4.5 | 4.5 | 4.6 | 4.5 | 2.9 | 2.9 | 4.2 |
| $ZnO$ | | | | | 8.6 | 8.8 | 5.2 |
| $MoO_3$ | 1.1 | | | | | 1.1 | 4.0 |
| $WO_3$ | | 1.8 | | 1.8 | 1.8 | | |
| $V_2O_5$ | | | | | | | |
| $TiO_2$ | | | 0.6 | | | | |
| $P_2O_5$ | 2.5 | 2.5 | 1.4 | 1.4 | 1.3 | 1.3 | 2.8 |

The temperature of the articles formed from the glasses of Tables 1–A and 1–B was raised from room temperature, at various rates not exceeding 10° C. per minute, progressively in a single stage to the final crystallization temperature shown in the first line of Tables II–A and II–B under the corresponding composition number. This temperature was maintained for the time shown in the second line of Tables II–A and II–B before cooling to room temperature.

TABLE II-A

| Heat-Treatment | Composition No. | | | | | | | | | |
|---|---|---|---|---|---|---|---|---|---|---|
| | 1 (a) | 1 (b) | 1 (c) | 2 | 3 | 4 | 5 | 6 | 7 | 8 (a) |
| Temperature, ° C | 1,000 | 1,050 | 1,025 | 1,000 | 1,000 | 1,000 | 1,000 | 1,000 | 1,000 | 1,000 |
| Hours | 2 | 2 | 2 | 5 | 5 | 2 | 2 | 2 | 5 | 5 |
| Properties of glass-ceramic: | | | | | | | | | | |
| Modulus of Rupture, p.s.i. × $10^{-3}$ | 21 | 23.2 | 24 | | 11.9 | 28.1 | 31.4 | 23.6 | 10.3 | |
| Expansion coeff. per °C. × $10^{-7}$ (20–500°) | 19.6 | 20.6 | 20.6 | <20 | 6.9 | 29.6 | 17.3 | 3.5 (¹) | 5.4 | 3.8 |
| Main crystal phase in glass-ceramic | | | | | | | | | | |

¹ Beta-eucryptite.

TABLE II-B

| Heat-Treatment | Composition No. | | | | | | | | | |
|---|---|---|---|---|---|---|---|---|---|---|
| | 8 (b) | 9 | 10 | 11 (a) | 11 (b) | 12 (a) | 12 (b) | 13 | 14 (a) | 14 (b) |
| Temperature, ° C | 800 | 1,000 | 1,000 | 1,000 | 950 | 1,000 | 950 | 1,000 | 1,000 | 1,050 |
| Hours | 6 | 5 | 5 | 5 | 24 | 5 | 24 | 5 | 2 | 2 |
| Properties of glass-ceramic: | | | | | | | | | | |
| Modulus of Rupture, p.s.i. × $10^{-3}$ | | | | | | 10 | | | 17.6 | 17.8 |
| Expansion coeff. per ° C. × $10^{-7}$ (20–500° C.) | 6.2 | 2.3 | 9.9 | 12.0 | −5.2 (¹) | 17.1 | 5.4 | 22.3 | 8.2 | 19.0 |
| Main crystal phase in glass-ceramic | | | | | | | | | | |

¹ Beta-eucryptite.

Where one composition has been subjected to different alternative heat-treatments, these are designated (a), (b), etc. Compositions numbers 1, 2 and 3 were raised to the final crystallization temperature at the constant rate of 5° C. per minute. Tables II–A and II–B also show certain of the physical properties of the resulting glass-ceramics, in particular the modulus of rupture, the thermal expansion coefficient, and the main crystal phase as determined by X-ray diffraction analysis.

The glass-ceramics thus formed were of microcrystalline structure, non-deformed and uncracked, and have, as will be seen from Tables II–A and II–B, good mechanical strengths and linear thermal expansion coefficients of less than $30 \times 10^{-7}$ in the range 20°–500° C.

The main crystal phase of the glass-ceramics for which a main crystal phase is not shown in Table II–A or II–B is a phase varying in a continuous series of solid solutions, between which significant variations cannot be distinguished, from beta-eucryptite to beta-spodumene. Those predominantly beta-eucryptite are associated with the lower coefficients of thermal expansion, and those predominantly beta-spodumene are associated with the higher coefficients of thermal expansion.

We claim:
1. A method of making a glass-ceramic article which includes forming the article in a glass consisting of, as major constituents, silicon dioxide, aluminium oxide, lithium oxide and optionally magnesium oxide within the following ranges in percentages by weight:

| | |
|---|---|
| $SiO_2$ | 60–66 |
| $Al_2O_3$ | 18–20 |
| $Li_2O$ | 5.0–6.0 |
| MgO | 0–3.0 | and further consisting of at least one nucleating agent selected from the group consisting of tungsten oxide, molybdenum oxide, phosphorus pentoxide, vanadium oxide, and titanium oxide, the major constituents together with the nucleating agent totalling at least 90 percent of the glass, said method including the step of heat-treating said glass article by raising its temperature substantially directly in a single stage to a value of the temperature at which devitrification takes place, holding said article at said value of the temperature for a sufficient period to devitrify said glass to a predominantly crystalline glass-ceramic material, and allowing it to cool to room temperature.

2. A method as claimed in claim 1 wherein the temperature is raised in said single stage at a rate between 3° and 10° C. per minute to a crystallization temperature between 800° C. and 1,050° C.

3. A method as claimed in claim 2 wherein the temperature is raised in said single stage at the rate of 5° C. per minute to a crystallization temperature of about 1,000° C.

4. A method as claimed in claim 2 wherein said crystallization temperature is held for 2–24 hours.

References Cited

UNITED STATES PATENTS

| | | | |
|---|---|---|---|
| 2,920,971 | 1/1960 | Stookey | 65—33 X |
| 3,063,198 | 11/1962 | Babcock | 65—33 X |
| 3,113,877 | 12/1963 | Janakirama-Rao | 65—33 |

OTHER REFERENCES

Central Glass Ceramic Research Institute Bulletin (India), vol. 10, No. 2, 1963, article entitled "Nucleation and Centralled Crystallisation of Glass," by R. L. Thakur, pages 51 to 66. Presented at a seminar at the Central Glass and Ceramic Research Institute, Mar. 12, 1962, Calcutto–32, India.

S. LEON BASHORE, *Acting Primary Examiner.*

DONALL H. SYLVESTER, *Examiner.*

F. W. MIGA, *Assistant Examiner.*